June 16, 1959 K. H. DATE 2,891,121
REPEATING CIRCUIT INTERRUPTER WITH SELECTABLE RECLOSING TIME
Filed May 1, 1957 3 Sheets-Sheet 1

INVENTOR.
Kazuo Henry Date
BY Ralph G. Hohenfeldt
Attorney

June 16, 1959  K. H. DATE  2,891,121
REPEATING CIRCUIT INTERRUPTER WITH SELECTABLE RECLOSING TIME
Filed May 1, 1957  3 Sheets-Sheet 2

INVENTOR.
Kazuo Henry Date
BY
Ralph G. Hohenfeldt
Attorney

June 16, 1959　　　K. H. DATE　　　2,891,121
REPEATING CIRCUIT INTERRUPTER WITH SELECTABLE RECLOSING TIME
Filed May 1, 1957　　　　　　　3 Sheets-Sheet 3
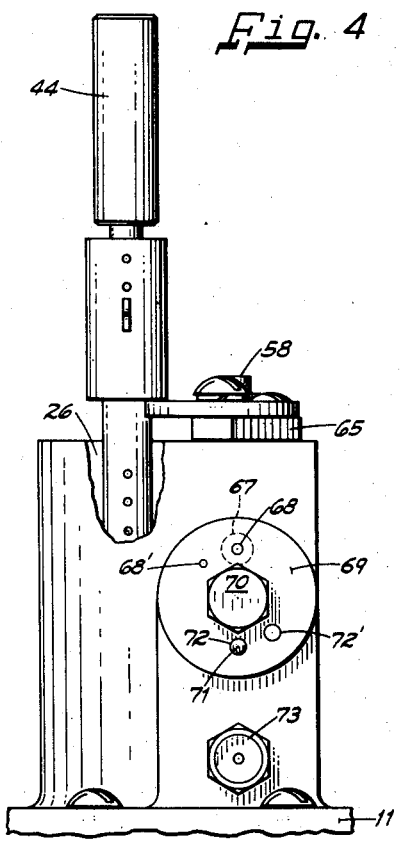
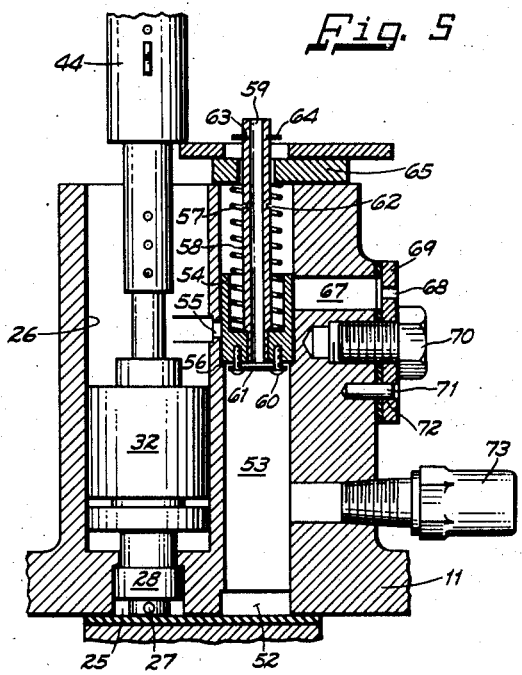
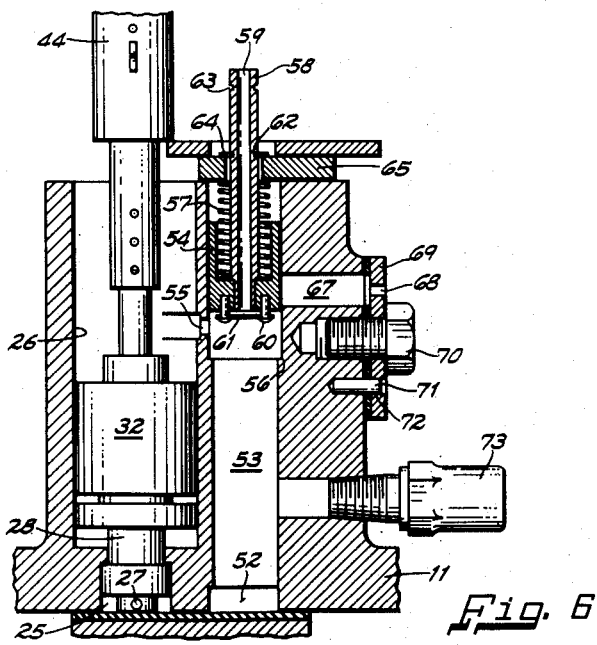
INVENTOR.
Kazuo Henry Date
BY Rolph G. Hohenfeldt
Attorney

United States Patent Office 2,891,121
Patented June 16, 1959

2,891,121

REPEATING CIRCUIT INTERRUPTER WITH SELECTABLE RECLOSING TIME

Kazuo Henry Date, South Milwaukee, Wis., assignor to McGraw-Edison Company, Milwaukee, Wis., a corporation of Delaware Application May 1, 1957, Serial No. 656,259

7 Claims. (Cl. 200—89)

This invention relates to a self-contained fluid immersed repeating circuit interrupter of the type adapted to respond to overloads by executing an operational sequence consisting in a number of alternate instantaneous interrupter switch openings and reclosures if the fault is temporary, and a further number of retarded openings followed by lockout if the overload is persistent. More particularly, the invention constitutes means for controlling and selecting the time lapse between overload responsive opening of the interrupter and its reclosure. An interrupter having the features above outlined is commonly known as a recloser and will be so designated herein for the sake of brevity.

To protect an electric distribution system against overloads and faults it is customary to install a recloser between the source of power and the individually fused branch lines and to precede the recloser with a backup fuse or circuit breaker. If a branch line becomes temporarily faulted, by a falling twig or lightning stroke, for example, and the recloser is adjusted for the standard timing, it will open instantaneously, but it will reclose only after an intentional delay whose purpose is to allow time for the backup and branch line fuses to cool, the fault arc to deionize, and the foreign object to fall clear of the affected line. If the fault does not clear during the closely successive instantaneous opening operations, and if the recloser is adjusted for standard operation, the sequence continues with retarded opening operations followed by delayed reclosures, and ultimately by lockout.

Standard operational timing is preferred when it is desired to coordinate the recloser with the smallest branch and backup fuses, because the intentional delay in reclosing allows the fuses greater cooling time between operations and it also allows more time for the fault to clear while the recloser is open. Nevertheless, there are circumstances under which a shorter, less delayed reclosing time is preferable. For example, a recloser may supply a branch line including loads such as a textile mill or an irrigation pumping system whose motor contactors would drop out for every temporary fault if excessive delay occurs before restoring power after a fault response. In the first instance, stopping of the motors may cause many threads to break in the textile machinery, and in the second instance, it may be necessary to reinstate a lot of siphons that are transferring water from one irrigation ditch to another. In both instances, the inconvenience resulting from even a very temporary loss of power is obvious.

It is immediately apparent that it would be beneficial if the recloser design allowed the user to choose the reclosing time sequence that is best suited to the peculiarities of the circuit in which the recloser is to be installed.

Accordingly, it is an object of the present invention to provide a recloser whose reclosing time sequence may be easily selected prior to installation by the user.

More specifically, an object of this invention is to provide a dual time-current characteristic recloser that may be adjusted for executing the more customary sequence of instantaneous and retarded opening operations where each is followed by constant, delayed reclosing, or in the alternative, that may be adjusted for instantaneous interrupter openings being followed by quick reclosures and for retarded openings in the same sequence being followed by delayed reclosures. Stated in another way, achievement of this object impresses a recloser with the ability to execute the same number of fast reclosures as there are instantaneous openings and the same number of delayed reclosures as there are retarded openings.

A further object is to modify the slide valve in a hydraulic recloser so that the valve exhibits a new mode of cooperation with fluid orifices that control interrupter opening and reclosing times. More particularly, this object contemplates the provision of manually selectable stop means for positioning the slide valve for controlling reclosing time solely by itself or for positioning the same so that under certain circumstances, it cooperates with the recloser's operation integrating mechanism to control reclosing time.

It is a general object of the invention to provide an improved and more versatile recloser. More specific objects will appear periodically throughout the course of the ensuing specification.

A more detailed explanation of the invention will now be set forth in conjunction with the following drawings in which:

Fig. 4 is a fragmentary elevational view of the recloser integrating and timing assembly taken from the left side of Fig. 1;

Fig. 5 is a fragmentary sectional view taken on the irregular line 5—5 of Fig. 2 showing the reclosing time controlling slide valve adjusted for standard operation; and, Fig. 6 shows the reclosing time slide valve adjusted for fast reclosing when preceded by instantaneous opening operations and delayed reclosing when preceded by retarded opening operations.

The recloser chosen for illustrating the invention is described in considerable detail in the copending application of Date et al., filed February 14, 1957, Ser. No. 640,167, and assigned to the instant assignee. Consequently, only the general features of the recloser will here be outlined to the extent necessary for establishing a situs for the instant improvements.

Figure 1:
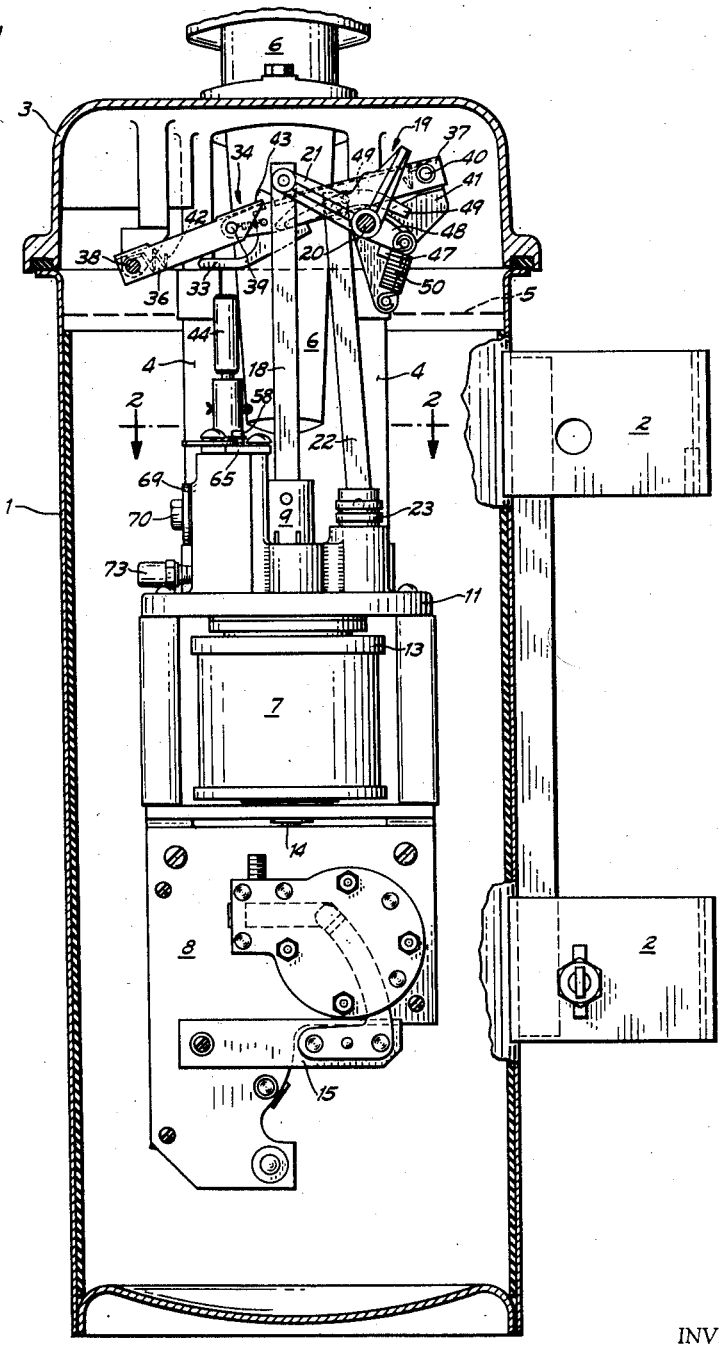
Fig. 1 is a vertical sectional view taken through the tank of a recloser that embodies the invention.
Figure 2:
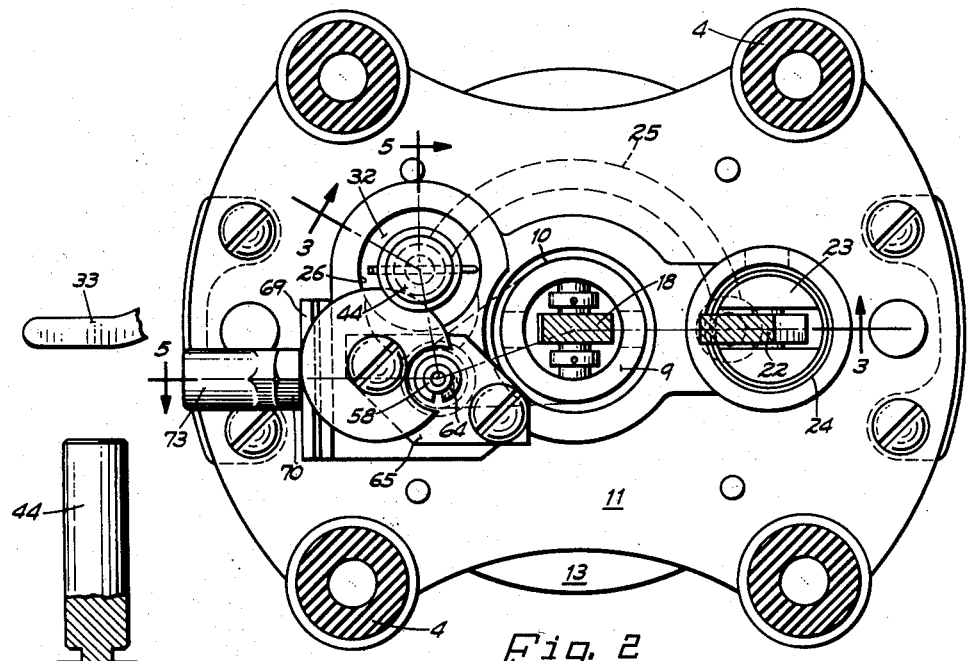
Fig. 2 is a sectional, plan view of the recloser operating mechanism taken on the line 2—2 of Fig. 1.

In Fig. 1 it may be seen that the recloser comprises a metal tank 1 provided with welded-on mounting brackets 2. The tank has a cast metal gasketed cover 3 from which the internal recloser mechanism is suspended on insulating stringers 4. Tank 1 is ordinarily filled with dielectric fluid, such as oil, to the level indicated by the dashed line 5.

The recloser is of the series type where a line wire, not shown, is brought into a porcelain insulating bushing 6 extending internally of the tank to a depth below the oil level 5. The incoming power line connects to a series operating coil 7 which is further serially connected to a fluid immersed interrupting switch, designated generally by the reference numeral 8, and shown located near the bottom of the recloser tank 1. From the interrupter switch 8, the circuit continues through another outgoing porcelain bushing and to the power line, neither of which are shown.

Figure 3:
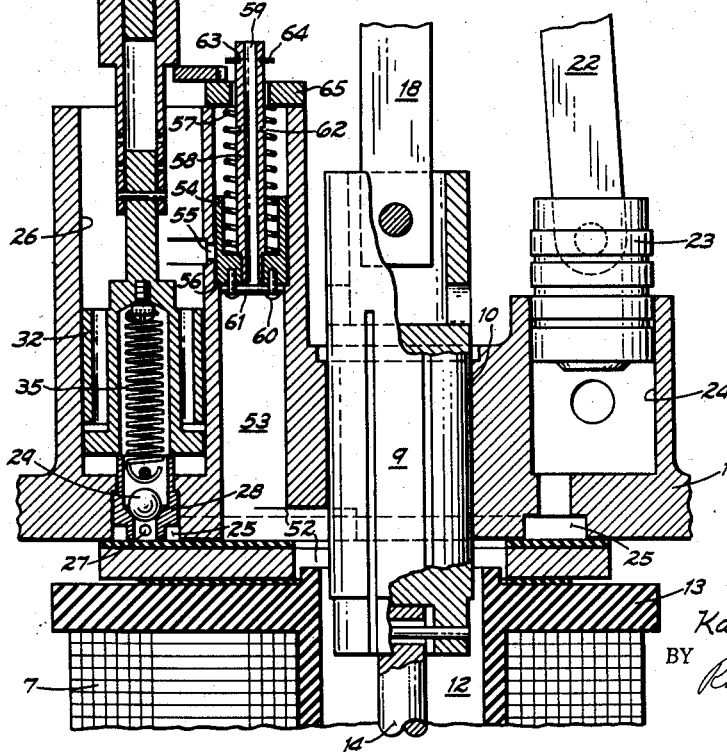
Fig. 3 is a vertical sectional view, with parts broken away, taken on the irregular line 3—3 of Fig. 2.

When series coil 7 is traversed by overload current, that is, by a current equal in magnitude to twice the rated steady state load current of the coil, a magnetic plunger 9 is attracted downwardly. In Fig. 3 it will be seen that magnetic plunger 9 descends through a bore 10 in head casting 11 and into a dashpot cylinder 12 inside the insulating spool 13 upon which the series operating coil 7 is wound. Although it is obscured in the drawings, dashpot cylinder 12 is closed at its bottom except for a clearance hole through which an interrupter switch operating rod 14 extends. Joint descent of plunger 9 and operating rod 14 causes the interrupter switch 8 to open through an overcenter spring arrangement, that is not shown, but which finally results in a movable contact arm 15 swinging clockwise through an angle of approximately seventy-five degrees. Upon this event, series operating coil 7 is deenergized and the overcenter spring, not shown, restores movable contact arm 15 to closed circuit position and likewise elevates plunger 9 to the closed circuit position in which it resides in Fig. 1. For present purposes it is sufficient to recognize that when an overload occurs, plunger 9 is attracted downwardly in dash pot cylinder 12 under the magnetic influence of coil 7, thereby opening interrupter switch 8 and deenergizing coil 7 which is in series with it. Interrupter switch 8 is provided with a stored energy spring, not shown, that restores plunger 9 to its shown position and at the same time recloses interrupter switch 8 shortly after it opens.

Through an insulating link 18, magnetic plunger 9 is connected to a double armed lever 19 that is loosely journalled on a shaft 20. Bearings for shaft 20, supported in cover 3, are not shown. Also attached to one arm 21 of the double armed lever 19 is another downwardly directed pivotally connected insulating link 22 that drives a pump piston 23. Each time magnetic plunger 9 descends to open the interrupter switch 8, pump piston 23 likewise takes a corresponding stroke and delivers a definite quantity of fluid out of the bottom of its cylinder 24 and into an arcuate discharge duct 25. Duct 25 connects with an integrating piston cylinder 26 through a small hole 27, in a ball seat insert 28, that admits oil under pressure from pump 23 into the integrating piston cylinder. Fluid flow out of integrating cylinder 26 is prevented by a ball check 29, see Fig. 3.

Within cumulative cylinder 26 there is an integrating piston 32 that advances upwardly in a step-by-step manner in accordance with measured quantities of fluid delivered underneath it by strokes of pump piston 23. If the recloser executes a number of closely successive opening operations, usually four, integrating piston 32 will be advanced to an uppermost position whereupon it will strike a trip finger latch 33 which controls a lockout assembly, generally identified by the reference numeral 34, see Fig. 1. If the recloser executes a lesser number of opening operations, that is, if the overload disappears before lockout, integrating piston 32 advances upwardly to an intermediate position and resettles to the position in which it is shown in Fig. 3 by means of leakage about its periphery and under the influence of a resettling spring 35 which is attached at one end to the ball seat insert 28 and at its other end to the interior of piston 32, as shown most clearly in Fig. 3.

Lockout of the recloser, following a number of closely successive opening and reclosing operations will now be discussed in greater detail. For this purpose there is provided the toggle link assembly, generally identified by the reference numeral 34, and consisting primarily in two partially nested channel links 36 and 37. Link 36 is anchored on a fixed pivot 38 and hinged on adjacent link 37 by means of a hinge pin 39. Link 37 is in turn pivotally connected at its right end by a laterally extending pin 40 to a rocking lever 41 which is also loosely journalled on shaft 20. Although it is not shown, there is a conventional external operating handle fixedly pinned to shaft 20 at the back of cover 3 in Fig. 1.

Stretched across the toggle link assembly 34 between fixed pivot 38 and laterally extending pivot pin 40 there is a lock out spring 42 which tends to cause toggle links 36 and 37 to jackknife upwardly in the event of recloser lockout. However, this is normally prevented by latch trip member 33 which has a hook portion 43 overhanging one end of toggle link 36 and is pivotally carried on the other toggle link 37 in such manner that its trip finger extends downwardly into proximity with a stem 44 that projects from integrating piston 32. It is evident that when stem 44 strikes latch finger 33 that hook 43 will be released and toggle links 36 and 37 will jackknife upwardly under the influence of lockout spring 42. This causes rocking lever 41 to execute a counterclockwise movement and further causes laterally extending pin 40 to swing to the left and strike the double armed lever 19. Pin 40 thereby restrains magnetic plunger 9 and pump piston 23 downwardly. The effect of this is to hold open interrupter switch 8 until the toggle is manually reset by rotation of shaft 20, see Fig. 1, through the agency of the external operating handle, not shown.

Note that there is a small pad 47 projecting laterally from rocking lever 41 into the path of a short arm 48 which is fixedly carried by shaft 20. Thus, when the rocking lever rotates counterclockwise at lockout, short arm 48 is driven counterclockwise as is shaft 20. This causes the operating handle to execute a corresponding angular movement and serves as a visual indication that the interrupter is locked open.

To effect manual lockout of the recloser by collapse of the toggle link assembly 34, shaft 20 may be rotated counterclockwise as viewed in Fig. 1 so that short arm 48 strikes a crescent shaped lever 49 which bears upon toggle latch 33 in the manner shown. It is evident that rocking of crescent shaped lever 49 causes the unlatching of hooked end 43 and collapse of the toggle assembly in an upward direction with a consequence that magnetic plunger 9 will descend to permanently hold open interrupter switch 8.

Manual resetting of the toggle link assembly may be achieved by imparting a clockwise rotation to shaft 20 and likewise short arm 48. Short arm 48 then engages projecting pad 47 and causes rocking lever 41 to rotate in a clockwise direction and extend the toggle links 36 and 37 into alignment with each other until they are latched by hook 43. Upon this event the stored energy spring of the interrupter switch 8 again raises the magnetic plunger and pump piston to their Fig. 1 positions.

Arm 48 is interconnected with rocking lever 41 through a tension spring 50 which exerts a force on short arm 48 and thereby holds shaft 20, and accordingly the operating handle in a definite position when the recloser is closed.

Each time plunger 9 descends during recloser overload operation, it displaces fluid from dashpot cylinder 12 through a duct 52 and further into a slide valve passageway 53. When the recloser is executing the first of its closely successive opening operations, a slide valve body 54 is forced upwardly, under the influence of hydraulic pressure created by plunger 9, and hydraulic fluid is allowed to discharge freely above integrating piston 32 through an escape orifice 55. Since the discharge of fluid is unimpeded as long as escape orifice 55 is open, plunger 9 is able to descend with great rapidity and open interrupter switch 8 almost instantaneously following initiation of the flow of overload current through series coil 7. However, since integrating piston 32 forcibly rises in a step-by-step manner toward closing escape orifice 55, after a predetermined number of recloser opening operations escape orifice 55 is blocked by the integrating piston. This causes back pressure to be built up in the slide valve passageway 53 and retards the descent of magnetic plunger 9, thereby effecting retarded switch opening for the remainder of the switch operations until lockout occurs.

Referring particularly to Fig. 3, where the recloser is shown adjusted for the standard reclosing time mentioned earlier, it will be seen that slide valve assembly comprises the valve body 54 which is biased to a lowermost position against a slide valve passageway shoulder 56 under the influence of a compression spring 57 that is nested within the valve body. Valve body 54 is penetrated at its bottom by a tight fitting shouldered tube 58 that has an aperture 59 for placing the fluid ambient in the tank and the fluid in slide valve passageway 53 in communication.

At its bottom, valve body 54 is provided with a pair of axially projecting headed pins 60 which support a valve disc member 61 that controls flow through tube aperture 59. The valve disc 61 is loosely hung on pins 60 so that when fluid pressure is generated in slide valve passageway 53 underneath the valve disc, the latter will be forced upwardly to close aperture 59 extending through tube 58. Conversely, when pressure in passageway 53 is relieved, disc 61 falls to the shown position where it opens the aperture through tube 58. It is also to be noted that when fluid pressure in passageway 53 compels closing of aperture 59 by means of valve disc 61, that slide valve body 54 is forced upwardly in opposition to spring 57 and that escape orifice 55 is thereby opened at least during the instantaneous recloser opening operations. Thus, whenever the descent of plunger 9 creates pressure in passageway 53, slide valve body 54 is forced upwardly and fluid is ejected through escape orifice 55 if the integrating piston is down and pressure is built up in the slide valve assageway 53 when the integrating piston 32 blocks the escape orifice 55. Also during standard operational sequence, whenever plunger 9 ascends, slide valve 54 is drawn downwardly to close escape orifice 55 so that all fluid replenishing plunger cylinder 12 is admitted through aperture 59 in the bottom of the slide valve. This means that plunger 9 will ascend at the same rate during each standard timed reclosing operation regardless of whether or not the opening operation preceding it was instantaneous or retarded.

Before proceeding with a discussion of the novel variable reclosing time features, reference is again made to Fig. 5 where it may be seen that slide valve body 54 not only controls escape orifice 55 but also controls a short lateral duct 67 which leads to an aligned discharge orifice 68 of a timing plate 69. The purpose of the timing plate orifices 68 is to facilitate selecting the opening time-current characteristic curve desired. By viewing Fig. 4 it will be seen that the timing plate 69 is carried on a cap screw 70 upon which the former is adapted to be rotated for placing in registry with duct 67 any one of a plurality of different size orifices 68 and 68', see Fig. 4. To secure the timing plate orifices in exact positions of registry with the lateral duct 67, there is provided an indexing pin 71 that penetrates one or the other of two similar indexing holes 72 and 72'. It will be noted that duct 67 communicates with the slide valve cylinder 53 at a level above the escape orifice opening 55. Whenever slide valve body 54 is forced upwardly by pressure incident to descent of magnetic plunger 9, the slide valve body moves sufficiently to open duct 67 and allows some discharge of fluid through timing orifice 68.

In order to limit hydraulic pressure to safe values and to assure very fast interrupter switch opening under inordinately large overload forces exceeding the rating of the recloser, there is provided a relief valve, generally designated by the reference numeral 73, that removes all hydraulic restraint when a predetermined pressure is developed incident to an excessive overload. Relief valve 73 may be of the ball check type adapted to open at a predetermined pressure and to permit discharge of fluid from slide valve cylinder 53 into the dielectric fluid ambient in which the recloser mechanism is immersed.

The instant invention facilitates selection of another reclosing characteristic by controlling the position of the slide valve body 54 with respect to escape orifice 55. This is achieved through providing the outer surface of tube 58 with a pair of circular indexing grooves 62 and 63 which are axially spaced from each other. As shown in Fig. 3, the uppermost indexing groove 63 is occupied by a snap ring 64 that is of no effect in the Fig. 3 setting insofar as stopping movement of the slide valve body is concerned since the latter rests against shoulder 56 when the recloser is set for normal operation. In Fig. 6, however, the snap ring stop 64 is set in registry with the lowermost annular groove 62 so that the slide valve body is suspended in such position that escape orifice 55 is maintained open. Under this circumstance, valve spring 57 is slightly compressed and tends to urge the slide valve body 54 downwardly, but the snap ring 64 bears on an apertured plate 65 that prevents such movement of the slide valve body. With the snap ring 64 established in lower groove 62 as illustrated in Fig. 6, it will now be shown that the recloser is adjusted to reclose without time delay following instantaneous opening operations and to reclose with time delay following retarded switch 8 opening operations. In contrast, when the snap ring 64 is in upper groove 63, the recloser recloses with a constant time delay whether it had previously opened under retardation or instantaneously in response to an overload.

Reference is made to Fig. 6 where the slide valve assembly is shown adjusted for impressing the recloser with a different reclosing characteristic than that which it has when adjusted in its Fig. 5 position. When plunger 9 descends during the first of a successive series of overload operations, fluid is forced through passageway 53 and out of escape orifice 55 above integrating piston 32. In Fig. 6, since the escape orifice is open, plunger 9 is unretarded in its descent and the interrupter switch 8 opens instantaneously following initiation of the flow of overload current through coil 7. Also during the switch opening operation, slide valve 54 is forced upwardly to a position where it opens timing duct 67 and thereby allows further escape or fluid through timing orifice 68. When the flow of overload current ceases as a result of series coil 7 being deenergized by opening of the interrupter switch 8, plunger 9 begins to rise and draws fluid freely through escape orifice 55, and a small quantity is also drawn through tube aperture 59 of the slide valve by reason of valve disc 61 being away from the aperture. Consequently, plunger 9 is permitted to ascend and reclose the interrupter switch with a minimum of delay following opening of the same when orifice 55 is open.

As the sequence of opening and reclosing operations continues, integrating piston 32 is urged upwardly in a step-by-step manner, by displacement of pump piston 23, until the integrating piston closes or blocks escape orifice 55. Subsequent opening operations, and incidentally, subsequent descents of the plunger 9 are thereby retarded since considerable back pressure is built up in the slide valve passageway 53. Even though escape orifice 55 is blocked by the integrating piston, slide valve body 54 moves upwardly in opposition to compression spring 57 and opens lateral timing duct 67 to allow discharge of some fluid through the timing orifice 68.

When the flow of fault current ceases following the retarded switch opening just described, the ascent of plunger 9, and therefore, reclosing of switch 8, are retarded because free inflow of fluid to dashpot cylinder 12 is prohibited by reason of escape orifice 55 being blocked by the upwardly advanced integrating piston 32. However, at this time, valve body 54 is drawn downwardly as shown in Fig. 6 until it is arrested in its movement by snap ring 62 striking stop plate 65. Then the reduction of pressure in passageway 53 permits valve disc 61 to move away from aperture 59 and thereby allow limited inflow of fluid to the passageway 53 and dashpot cylinder 12. Throttling of the fluid through aperture 59 limits the rate at which plunger 9 may ascend and effects retarded reclosing of the interrupter switch whenever the reclosing is preceded by a delayed opening operation if snap ring 64 is located in lower groove 62 as in Fig. 6. In summary, when the slide valve 54 is set as in Fig. 5 the recloser will open instantaneously following initation of the flow of fault current, because escape orifice 55 is open during the first operations in a closely successive series. However, reclosing is time delayed since slide valve 54 drops down, closes the escape orifice, and throttles fluid through aperture 59 of the slide valve tube 53. Reclosing is also time delayed when the opening operations are retarded by reason of the escape orifice being blocked by advance of integrating piston 32.

When the slide valve 54 is set as in Fig. 6, that is, when it is suspended away from escape orifice 55 by moving snap ring 64 to a different position from that shown in Fig. 5, the recloser will open instantaneously for reasons set forth in the preceding paragraph, but it will now reclose at a faster rate since the escape orifice is not cut-off by the the slide valve body. Hence, instantaneous opening is followed by quick reclosing. When the integrating piston 32 advances to block the escape orifice and cause retarded opening of the recloser, reclosing also becomes time delayed or retarded since the fluid inflow into the magnetic plunger cylinder 12 is throttled through aperture 59.

Although a preferred construction for varying the reclosing time of a recloser has been described, such description is to be considered illustrative rather than limiting for the invention may be variously embodied and is to be construed by interpretation of the claims which follow.

It is claimed.

1. A fluid immersed repeating circuit interrupter whose reclosing time sequence may be adjusted to correspond with its opening time sequence or whose reclosing time may be adjusted for a constant value comprising switch means, cylinder means communicating with a passageway that includes an escape orifice and a timing orifice spaced from each other, a normally ineffective magnetic plunger operatively connected to the switch means, said plunger being movable in a first direction in response to an overload to open the switch means and discharge fluid through both orifices during fast switch opening operations, switch reclosing means operable to move said plunger in a second direction that causes intake of fluid to the cylinder means by way of the passageway, integrating piston means advanceable in steps to block said escape orifice and effect retarded switch opening movement of the plunger, in combination with a slide valve having a constant volume intake aperture and two characteristics for cooperating with said escape orifice, said slide valve being spring biased toward closing both orifices during a constant time switch reclosing interval to thereby limit fluid intake through only the slide valve aperture under one characteristic, and manually adjustable means limiting movement of the slide valve for closing only the timing orifice under another characteristic, whereby free discharge and intake through the escape orifice is permitted until the escape orifice is blocked by the integrating piston to effect corresponding numbers of retarded switch openings and retarded closings.

2. The invention set forth in claim 1 including a tube means attached to the slide valve with its bore in registry with the slide valve aperture, said tube means having at least two index means spaced axially from each other, stop means movable with the tube means and adapted for selective registry with one index means for positioning said slide valve with respect to said orifices.

3. The invention set forth in claim 1 including a tube means attached to the slide valve with its bore in registry with the slide valve aperture, a pressure operated valve member carried by the slide valve and adapted to control said aperture in response to pressure in the passageway.

4. A fluid immersed repeating circuit interrupter whose reclosing time is adjustable comprising switch means, cylinder means in communication with a fluid passageway that includes an escape orifice and a relatively smaller timing orifice spaced from the other, a normally ineffective magnetic plunger in said cylinder means operatively connected to the switch means, said plunger being movable in a first direction upon occurrence of an overload to open the switch means and discharge fluid through both orifices, switch reclosing means operable to move said plunger in a second direction that causes intake of fluid to the cylinder means by way of said passageway, integrating piston means advanceable in steps toward blocking said escape orifice in response to successive operations of said plunger, in combination with an apertured slide valve having two characteristics for controlling intake of fluid through said orifices which characteristics are manually selectable for predetermining the desired switch reclosing time, said slide valve being biased for closing both orifices when set for one switch reclosing time characteristic and said slide valve being restrainable against the bias for closing only said timing orifice when set for another characteristic, and means for adjusting the slide valve travel with respect to the orifices.

5. An adjustable reclosing time fluid immersed repeating circuit interrupter comprising switch means, cylinder means in communication with a fluid passageway that includes an escape orifice, a normally ineffective magnetic plunger in the cylinder means and operatively connected with the switch means, said plunger being movable in one direction upon occurrence of an overload to open said switch means and discharge fluid into said passageway, switch reclosing means operable to move said plunger in another direction that causes intake of fluid through the escape orifice and passageway, integrating piston means advanceable in steps toward blocking said escape orifice in response to successive operations of said plunger for retarding plunger movement in said one direction after a predetermined number of operations thereof, in combination with valve means having two or more characteristics for controlling the intake of fluid through the escape orifice which characteristics are manually selectable for predetermining the particular switch reclosing time desired, and means for adjusting the position of the valve means with respect to the orifice.

6. A fluid immersed repeating circuit interrupter adjustable to automatically execute fast and retarded reclosing operations corresponding in number with fast and retarded opening operations, respectively, comprising switch means, cylinder means communicating with the immersing fluid through an escape orifice, a normally ineffective magnetic plunger in the cylinder means operatively connected with the switch means and movable in opposite directions for opening and closing the switch means and for discharge and intake of fluid through the escape orifice, operation integrating means including blocking means operable in response to a predetermined number of switch openings to block said escape orifice and retard switch opening movement of said plunger, dual characteristic valve means having open and closed positions and interposed between said escape orifice and said plunger cylinder and movable under the influence of said plunger to open said orifice during each switch opening operation, means form anually securing said valve means in open position with respect to said escape orifice for subjecting the orifice to exclusive control of the blocking means.

7. In a reclosing circuit interrupter of the fluid immersed type, switch means, a normally inactive plunger that moves in one direction in response to overloads to open said switch means and displace fluid and to draw in fluid when moving in another direction after the overload ceases, a slide valve body and a cylinder therefor having an escape orifice subject to positive and negative fluid pressure due to plunger movements, spring means biasing said valve body toward closure of said escape orifice, adjustably positionable stop means carried by and movable with the valve body, stationary means adapted to be engaged by the stop means for arresting said slide valve body with respect to said escape orifice in accordance with the preselected position of said stop means, whereupon a dual reclosing time characteristic is provided by preadjusting said stop so that said slide valve body will either maintain said escape orifice open or allow its closure when said plunger is moving in said other direction.

References Cited in the file of this patent

UNITED STATES PATENTS

| | | |
|---|---|---|
| 2,573,234 | Wallace et al. | Oct. 30, 1951 |
| 2,774,841 | Weinfurt | Dec. 18, 1956 |